United States Patent
Patel et al.

(10) Patent No.: US 11,537,572 B2
(45) Date of Patent: *Dec. 27, 2022

(54) MULTIDIMENSIONAL PARTITION OF DATA TO CALCULATE AGGREGATION AT SCALE

(71) Applicant: salesforce.com, inc., San Francisco, CA (US)

(72) Inventors: Yogesh Patel, Dublin, CA (US); Percy Mehta, Foster City, CA (US); Mattia Padovani, San Francisco, CA (US); Shan-Cheng Ho, Sunnyvale, CA (US); Shaahin Mehdinezhad Rushan, Dublin, CA (US); Johannes Kienzle, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/779,386

(22) Filed: Jan. 31, 2020

(65) Prior Publication Data

US 2021/0240678 A1 Aug. 5, 2021

(51) Int. Cl.
*G06F 16/215* (2019.01)
*G06F 16/27* (2019.01)
*G06F 16/28* (2019.01)

(52) U.S. Cl.
CPC .......... *G06F 16/215* (2019.01); *G06F 16/278* (2019.01); *G06F 16/283* (2019.01)

(58) Field of Classification Search
CPC ..... G06F 16/215; G06F 16/278; G06F 16/283
See application file for complete search history.

(56) References Cited

U.S. PATENT DOCUMENTS

| | | | |
|---|---|---|---|
| 7,730,478 B2 | 6/2010 | Weissman | |
| 9,323,809 B2 | 4/2016 | Johnson et al. | |
| 10,180,980 B2 | 1/2019 | Khan et al. | |
| 10,235,285 B1 | 3/2019 | Wallace | |
| 10,455,264 B2 | 10/2019 | Patel et al. | |
| 10,681,499 B2 | 6/2020 | Padovani et al. | |
| 10,762,109 B2 | 9/2020 | Rushan et al. | |
| 10,904,303 B2 | 1/2021 | Patel et al. | |
| 2009/0138593 A1* | 5/2009 | Kalavade | G06Q 10/0637 709/224 |

(Continued)

OTHER PUBLICATIONS

Lundahl et al., Java, How to get number of messages in a topic in apache kafka Feb. 19, 2015, stackoverflow.com, https://stackoverflow.com/questions/28579948/java-how-to-get-number-of-messages-in-a-topic-in-apache-kafka.*

(Continued)

*Primary Examiner* — Jay A Morrison
(74) *Attorney, Agent, or Firm* — Nicholson, De Vos, Webster & Elliott, LLP

(57) ABSTRACT

A method enables data aggregation in a multi-tenant system. The method includes receiving, at a data aggregation manager, an event from an activity tracking component, generating, by the data aggregation manager, a first hash value based on a first identifier in the event, generating, by the data aggregation manager, a second hash value based on a second identifier in the event, and storing event message information to an entry of a metric storage database in a partition according the first hash value and the second hash value.

20 Claims, 4 Drawing Sheets

(56) References Cited

U.S. PATENT DOCUMENTS

| | | | |
|---|---|---|---|
| 2013/0054648 | A1 | 2/2013 | Mehta et al. |
| 2013/0132861 | A1 | 5/2013 | Kienzle et al. |
| 2015/0142530 | A1 | 5/2015 | Motamedi et al. |
| 2015/0169733 | A1 | 6/2015 | Motamedi et al. |
| 2015/0379430 | A1 | 12/2015 | Dirac et al. |
| 2018/0060037 | A1* | 3/2018 | Johnson ............... G06F 7/08 |
| 2018/0210959 | A1 | 7/2018 | Khandelwal |
| 2018/0293280 | A1* | 10/2018 | Svec ............... G06F 16/289 |
| 2019/0140995 | A1 | 5/2019 | Roller et al. |
| 2019/0147404 | A1 | 5/2019 | Lue et al. |
| 2019/0163791 | A1 | 5/2019 | Sanathkumar et al. |
| 2019/0179673 | A1 | 6/2019 | Gray et al. |
| 2019/0179931 | A1 | 6/2019 | Gupta et al. |
| 2019/0213552 | A1 | 7/2019 | Gupta et al. |
| 2019/0238604 | A1 | 8/2019 | Sundaram et al. |
| 2019/0238605 | A1 | 8/2019 | Patel et al. |
| 2019/0370080 | A1 | 12/2019 | Patel et al. |
| 2020/0134081 | A1 | 4/2020 | Ho |
| 2020/0184291 | A1* | 6/2020 | Tisdel ............... G06K 19/07758 |
| 2020/0311637 | A1 | 10/2020 | Benani et al. |
| 2020/0311845 | A1* | 10/2020 | Steketee ............ G06Q 30/0201 |
| 2021/0034627 | A1 | 2/2021 | Mehta et al. |
| 2021/0149720 | A1 | 5/2021 | Mehta et al. |
| 2021/0240714 | A1 | 8/2021 | Ho et al. |
| 2021/0240738 | A1 | 8/2021 | Logan et al. |
| 2021/0243246 | A1 | 8/2021 | Patel et al. |

OTHER PUBLICATIONS

Abu Shareb, Delivering billions of messages exactly once Jun. 29, 2017, segment.com, https://segment.com/blog/exactly-once-delivery/.*

@Fintanr, The Rise and Rise of Apache Kafka Feb. 4, 2016, RedMonk, https://redmonk.com/fryan/2016/02/04/the-rise-and-rise-of-apache-kafka/.*

Rouse, data aggregation date unknown [captured on Dec. 13, 2018 by archive.org], techtarget.com, https://web.archive.org/web/20181213105548/https://searchsqlserver.techtarget.com/definition/data-aggregation.*

Vanlightly, Testing Producer Deduplication In Apache Kafka And Apache Pulsar Nov. 2, 2018, jack-vanlightly.com, https://jack-vanlightly.com/blog/2018/10/25/testing-producer-deduplication-in-apache-kafka-and-apache-pulsar.*

Vanlightly, HTML Source for Testing Producer Deduplication in Apache Kafka and Apache Pulsar Apr. 5, 2019, jack-vanlightly.com, view-source:https://jack-vanlightly.com/blog/2018/10/25/testing-producer-deduplication-in-apache-kafka-and-apache-pulsar.*

Non-Final Office Action, U.S. Appl. No. 16/779,395, dated Jan. 24, 2022, 29 pages.

Final Office Action, U.S. Appl. No. 16/779,395, dated Aug. 1, 2022, 13 pages.

* cited by examiner

MULTIDIMENSIONAL PARTITION OF DATA TO CALCULATE AGGREGATION AT SCALE

TECHNICAL FIELD

One or more implementations relate to the field of data management; and more specifically, to a process and system for data aggregation utilizing multidimensional partitioning and data deduplication.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience. The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

Event management systems can be utilized to manage data distribution in these types of systems. In current event management systems, a high volume of events is published by multiple event producers and then delivered to multiple consumers. The event management system is a large scale, asynchronous, distributed system where failures are inevitable due to network failures, equipment failures and similar issues. Events are organized into different streams. Publishing events as part of event streams is asynchronous.

The engagement of users that interact with software such as webpages, email programs, word processing, and similar applications and interfaces is also an important type of activity that is tracked to determine metrics that assist developers and administrators in improving and administering the software and interfaces. These engagements can be monitored by activity tracking software and collected as a set of events. This also generates a large amount of traffic in the form of data streams that report the various types of tracked activities. In complex multi-tenant and cloud computing environments collecting and corelating the events and then generating useful metrics is resource intensive. In particular, where real-time tracking of metrics is desired even minor inefficiencies can cause significant issues and use of resources.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for multi-dimensional partition of data to calculate aggregated metrics that is scalable to large data sets captured in multi-tenant cloud computing environments. The implementations 'partition' collected activity data from streams of events that are reported by activity tracking software. Partitioning the collective data segments the collective data set to make the handling of data less resource intensive and to reduce latency in handling the data set.

Figure 1:
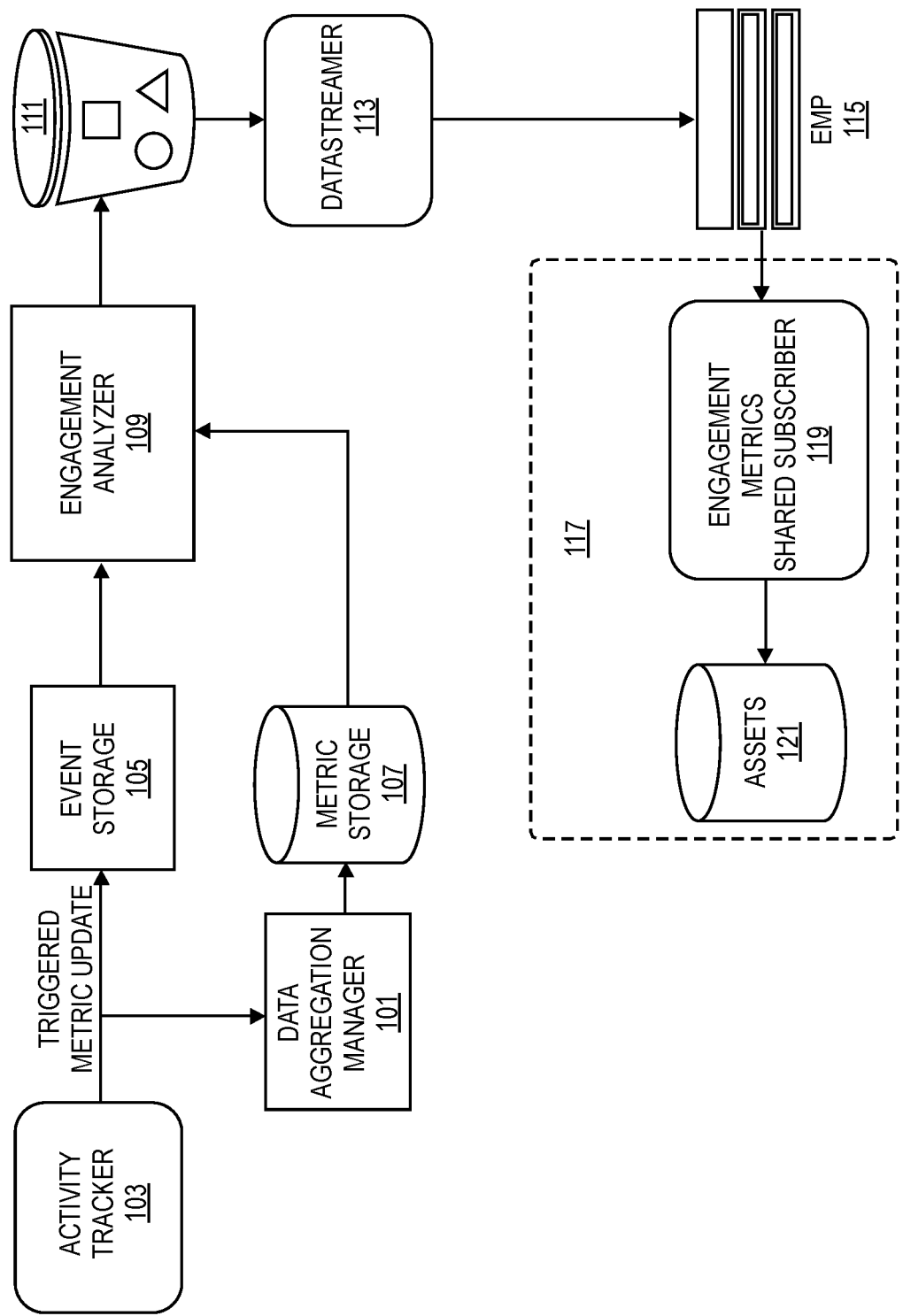
FIG. 1 is a block diagram illustrating an activity tracking architecture according to some example implementations.

FIG. 1 is a block diagram illustrating an activity tracking architecture according to some example implementations. The example architecture is provided by way of illustration and not limitation. One skilled in the art would appreciate that the example implementation can be applied to other contexts and architectures consistent with the principles and features described herein. The architecture includes an activity tracker 103, data aggregation manager 101, event storage 105, metric storage 107, engagement analyzer 109, data organizer 111, a data streamer 113, an enterprise messaging platform (EMP) 115, and tenant services 117 including engagement metrics subscription 119 and assets 121.

The components illustrated can be implemented in a multi-tenant cloud computing environment. Thus, each component can be implemented via distributed computing processes and resources. For sake of clarity and conciseness, the components are discussed as distinct software components implemented in a general multi-tenant cloud computing environment. However, one skilled in the art would understand that any number of instances of these components or distributed versions of these components can be executed in cluster nodes or similar units of execution in a cloud computing environment where the cluster nodes are managed by cluster management software or similar cloud computing environment management software. Similarly, these components can operate on or execute in virtualized software environments in combination with cloud computing environments, where instances of components execute within in any number of virtual machines or in similar virtual execution environment structures.

The activity tracker 103 can be any software capable of monitoring, and/or receiving and generating activity (also referred to as engagement) data relating to user interactions and similar software events. Any number of data streams of any number of events that report activity can be generated by the activity tracker 103. The activity tracker 103 can be implemented utilizing a distributed stream processing computation framework such as Apache Storm (managed by the Apache Software Foundation). In an example implementation, the activity tracker 103 can monitor and collected data related to email usage. A salesperson can send out an email to more than one million recipients that includes a sales promotion. When the recipients of the email interact with the email via actions like opening, viewing, replying, clicking on a link in the email, or similar actions, each of these activities can generate an activity or event that is output from the activity tracker 103 via a message queue. The organization where the salesperson who sent the email works would like to have real time information about these activities to determine the efficacy of the sales promotion sent via the email. Other example scenarios for implementation can include a call center where multiple marketers are working on leads for sales and the call center manager wants to monitor real time statistics related to interactions of the marketers with potential customers such as numbers dialed, number of voicemails left, live call conversations, call backs, and similar data.

The output from the activity tracker 103 is a set of data streams of messages with event information. These data streams are received by an event storage 105 and a data aggregation manger in route to a metric storage 107. The event storage 105, such as Apache Kafka (managed by the Apache Software Foundation) or similar event management or storage solution, receives the data streams and records the events from the messages in the data streams. The events can be stored in any format or schema and can be stored in any type of storage system or database management system.

In parallel, the data streams are received by the data aggregation manager 101 prior to storage in a metric storage 107. The metric storage 107 is an event or data storage system (e.g., Apache Cassandra (managed by the Apache Software Foundation)). The metric storage 107 stores metrics and related data relevant to generating metrics for the data streams output by the activity tracker 103. The data aggregation manager 101 organizes the data from the data streams prior to storage in the metric storage 107 to improve the efficiency of further utilizing the data by other components downstream such as the engagement analyzer 109. The data aggregation manager 101, described further in relation to FIG. 2, partitions the received data from the received data streams and performs deduplication of redundant data from the data streams.

The data aggregation manager 101 improves the scalability of collection and generation of real-time metrics. As the volume of data grows from engagement monitoring and similar activity tracking, it becomes more computationally and resource intensive to process in a real-time streaming manner. The message queue that is output by the activity tracker 103 includes data from multiple organizations (i.e., tenants) in a multi-tenant environment. The types of activities monitored (i.e., assets), and the consumers of the real-time metrics (i.e., a target audience) all are part of the process for proper collection, organization, and delivery of the relevant metrics and related data. Many metrics are determined by or retrieved using queries to the metric storage 107, for example by the engagement analyzer 109. However, broad-based queries over large data sets is slow regardless of the dedicated resources. The implementations improve the organization and accuracy of the data in the metric storage 107 while maintaining a high throughput and write performance for the data being streamed into the metric storage 107.

In one implementation, the data aggregation manager 101 partitions the received data from the received data streams based on a source organization (i.e., tenant), an asset identifier (e.g., a type of item or activity associated with an event such as a list email, email template, call script, or similar asset), and a target audience (i.e., a subscriber to an activity or metric that may be identified with a unique identifier referred to as a target audience identifier or WhoID). To partition the data, for example in a 'horizontal' and 'vertical' partition a hash of an asset identifier and the target audience identifier is performed. The horizontal partition distributes data across different cluster nodes of the cloud computing environment underlying the overall architecture including the data aggregation manager 101, metric storage 107, and engagement analyzer 109. The vertical partition reduces the amount of data to be read from the metric storage 107 to calculate an aggregate amount each time that a message from a data stream is processed to store a metric in the metric storage 107. In other implementations, other values can be utilized to similarly partition the data to be stored in the metric storage 107. These hash values are computed at the time that a message is processed and data is to be stored into the metric storage 107 and can be calculated when data is to be read from the metric storage 107 to retrieve the relevant data. The operation of the data aggregation manager 101 is discussed further herein below with relation to FIG. 2.

The engagement analyzer 109 can read from the metric storage 107 to collect metric information and marshal the information for further consumption downstream. The engagement analyzer 109 can also write back relevant information and generate events to be stored in the event storage 105 or passed downstream. In one implementation, the engagement analyzer can be implemented as an engagement writeback topology via Apache Spark (managed by the Apache Software Foundation) or similar cluster computing framework. The engagement analyzer 109 can stream data via a data organizer 111 and data streamer 113 to an enterprise messaging platform 115 to be consumed by a target user via tenant services 117.

A data streamer 113 manages the forwarding of data between platforms. In this example implementation data is being forwarded from an engagement platform to a tenant services platform. However, the downstream consumption is provided by way of example and not limitations. The implementations are applicable to any type of downstream consumption architecture. In this example implementation, the enterprise messaging platform 115 receives the streams of data from the data stream 113 where a target audience (e.g., a user of a tenant service 117) has subscribed to receive the real-time metrics via an engagement metrics subscription 119 that stores the information in a tenant assets database or similar tenant storage for consumption by the target audience via any metric viewing application or interface provided in the tenant services 117.

Figure 2:
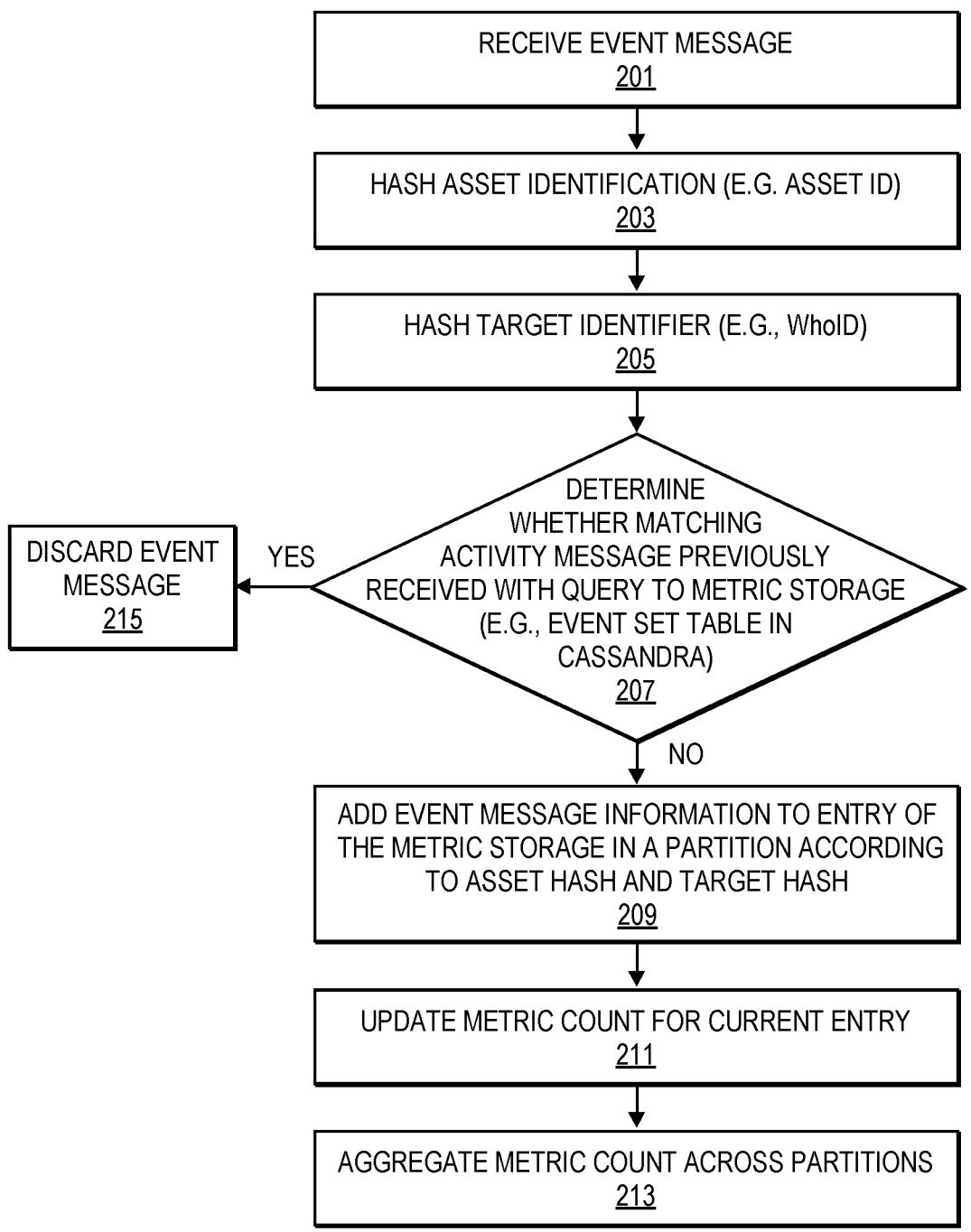
FIG. 2 is a flow diagram illustrating a process of a data aggregation manager according to some example implementations.

FIG. 2 is a flow diagram illustrating a process of a data aggregation manager according to some example implementations. In the example implementation, the metric storage can utilize a schema or table format such as:

```
CREATE TABLE IF NOT EXISTS engagement_aggregates.all_time_engagements (
    org_id text,
    horizontal_bucket int, // Hash of asset_id for Horizontal partition
    asset_id text,
    ChannelType text,
    ChannelAction text,
    vertical_bucket int, // Hash of WhoId for Vertical partition
    set_count int,
    event_set set<text>,
    source text,
```

```
PRIMARY KEY ((org_Id, bucket), asset_id, engagement_type, set_bucket)
)
WITH compaction = {'class' : 'LeveledCompactionStrategy'};
horizontal_bucket: Hash of assetId to distribute data across the cluster
vertical_bucket: Hash of WhoId to distribute data across different Sets in rows
```

As used herein, 'bucketing' refers to database partitioning. The horizontal bucket enables the chunking of data into different partitions of the metric storage to allow the metric storage to distribute the data to different cluster nodes. The vertical bucket enables the storage of the activity data with differing key values (e.g., the WhoId) on a same row with a set of columns in the metric storage, this enables a limit on a number of rows to query at the time data is retrieved from the metric storage.

This schema provides an example of the data that is tracked related to events from data stream messages in the metric storage. The org_id can be an identifier of the organization (i.e., tenant) associated with the event. The horizontal_bucket is a value that is a hash and modulo operation over the number of partitions where any hashing algorithm can be utilized. The asset_id is a unique identifier for an asset that the event or activity relates to such as an email opening or webpage link clickthru. A channel type and channel action can further identify information about the asset and the activity associated with the asset. The vertical_bucket is a value that is a hash and module operation over the number of partitions where any hashing algorithm, usually distinct from the hashing algorithm used for the horizontal bucket, can be utilized. The set_count is a value that tracks the number of the events or activities that have been tracked and recorded in this entry (i.e., the same type of event or activity) in this partition of the metric storage, the event_set stores information about each event or activity that is counted in this entry, the source is field that identifies a source of the event or activity (e.g., a source data stream or application). The primary key is a value calculated from other fields to uniquely identify each entry in the database.

The process of the data aggregation manger can be triggered in response to receiving a message with event information from the activity tracker (Block 201). The event message can be pushed from the activity tracker or pulled from the event storage by the data aggregation manager. The event message can have any format or content including at least and asset identifier and a target identifier (e.g., a WhoID). These values or similar values can be utilized for partitioning the data in the metric storage. A hash of the asset identifier modulo the number of partitions provides a first hash value (e.g., a horizontal bucket) (Block 203). Any hash algorithm can be utilized. A hash of the target identifier modulo the number of partitions provides for a second hash value (e.g., a vertical bucket) (Block 205). Any hash algorithm can be utilized.

Based on the two hash values a check is made in the metric storage to determine whether a prior instance of the same message has been received (Block 207). Since the information is multi-dimensionally partitioned, the query to check whether the message has previously processed can be done efficiently. If a copy of the message was previously processed, then the event message can be discarded (Block 215). If the event message has not been previously processed, then the event can be added to the corresponding entry or row in the appropriate partition of the metric storage (Block 209). The entry or row includes a metric count (e.g., the set_count of the example schema above), which is incremented each time a message is processed and added to the entry or row (Block 211). An aggregate metric can also be updated across partitions by summing or similar computing an aggregate value (e.g., a sum of the set_counts across the partitions) (Block 213). This value can be updated and output (e.g., to event storage or engagement analyzer). In other implementations, when the engagement analyzer or similar component queries for the aggregate metric a query retrieves and sums all of the metric counts across partitions.

In one example implementation the data aggregator can be implemented as a 'metric processor where the metric store is implemented as a Cassandra database and the event store is implemented in Kafka, where the process can be expressed in psuedocode:

```
-> All time Metric Processor:
    -> Read Engagement event from Kafka
        -> Calculate horizontal_bucket based on AssetId
        -> Calculate vertical_bucket based on WhoId
        -> Fetch Cassandra (org_Id, horizontal_bucket), asset_id, engagement_type, set_bucket)
            -> Cassandra Row does not exist
                -> Insert row with set_count as 1 and engagement key in event_set
            -> Else
                -> Check if the current engagement key is in the set
                -> if (exist)
                    This is replay, and nothing to do
            -> else
                -> Read current set_count and +1
                -> aggregate set_count values for assetId + Engagement type
                -> Build metric avro object and publish to Kafka for writeback
                -> Update Cassandra
```

In one example, a user named Carlos sends out two ListEmails for Org1 (ListEmail1 with Percy, Yogesh and Raj; and ListEmail2 with Johannes and Shardul). Using the example schema above for the metric storage: ((org_Id, horizontal_bucket), asset_id, engagement_type, vertical_bucket), setcount, event_set.

In this example, the following events are stored in the event storage for downstream consumers.

Engagement Events:
1. (Org1, HVS, 06012019), listemail1, Open, TimeT1, Percy,—
2. (Org1, HVS, 06012019), listemail1, Open, TimeT1, Yogesh,—
3. (Org1, HVS, 06052010), listemail1, Open, TimeT2, Percy,—
4. (Org1, HVS, 06012019), listemail2, Open, TimeT1, Johannes,—
5. (Org1, HVS, 06052019), listemail2, Open, TimeT2, Johannes,—
6. (Org1, HVS, 06012019), listemail1, LinkClick, TimeT1, Percy,—
7. (Org1, HVS, 06012019), listemail2, LinkClick, TimeT1, Shardul,—
8. (Org1, HVS, 06012019), listemail1, Open, TimeT1, Raj,—
. . .

These events are also referenced in Table I below as events #1-#8 under 'Event Engagements.' After the data aggregator processes these events and updates the metric store, the metric store may include:

horizontal_bucket is: Hash(AssetId) % bucketCount
Say Hash of (listemail1) % bucketCount=5
Hash of (listemail2) % bucketCount=7
vertical_bucket is: Hash(WhoId) % bucketCount
Say Hash(Percy) % bucketCount=10
Hash(Shardul) % bucketCount=20
Hash(Johannes) % bucketCount=30
Hash(Yogesh) % bucketCount=40
Hash(Raj) % bucketCount=10
Metrics All time Events:

TABLE I

| org_id | Horizontal bucket | asset_id | Engagement | Vert bucket | Event_set Count | Event Engagements (Engagement Keys) |
|---|---|---|---|---|---|---|
| Org1 | 5 | Listemail1 | Open | 10 (P, R) | 3 | #1, #3, #8 |
| Org1 | 5 | Listemail1 | Open | 40 (Y) | 1 | #2 |
| Org1 | 7 | Listemail2 | Open | 30 (J) | 2 | #4, #5 |
| Org1 | 5 | Listemail1 | Linkclick | 10 (P) | 1 | #6 |
| Org1 | 7 | Listemail2 | Linkclick | 20 (S) | 1 | #7 |

Thus, the example data set has been organized into the metric store across the horizontal and vertical partitions improving the efficiency of updating metrics and computing aggregate information.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Exemplary Electronic Devices
Electronic Device and Machine-Readable Media
One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3:
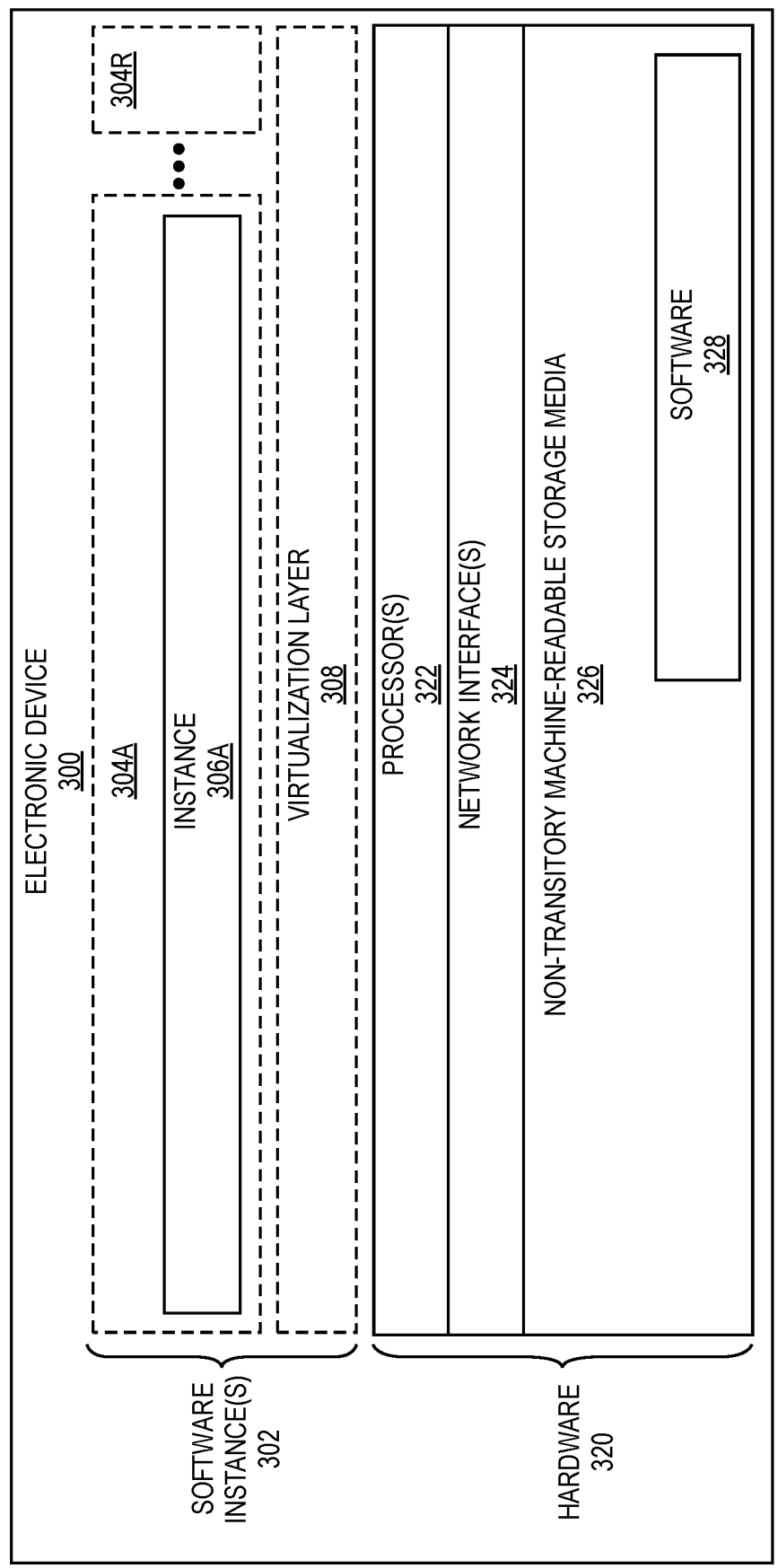
FIG. 3 is a block diagram illustrating an electronic device according to some example implementations.

FIG. 3 is a block diagram illustrating an electronic device 300 according to some example implementations. FIG. 3 includes hardware 320 comprising a set of one or more processor(s) 322, a set of one or more network interfaces 324 (wireless and/or wired), and non-transitory machine-readable storage media 326 having stored therein software 328 (which includes instructions executable by the set of one or more processor(s) 322). Each of the previously described components of the example architecture and the data aggregations manager may be implemented in one or more electronic devices 300. In one implementation: 1) each of the architectural components is implemented in a separate one of the electronic devices 300 (e.g., in electronic devices operated by users or the system where the software 328 represents the software to implement tenant components that are downstream from the data aggregation manager or that are monitored by the activity tracker (e.g., a web browser, a native client, a portal, a command-line interface, and/or an application program interface (API) based upon protocols such as Simple Object Access Protocol (SOAP), Representational State Transfer (REST), etc.)); 2) the data aggregation manager is implemented in a separate set of one or more of the electronic devices 300 (e.g., a set of one or more server electronic devices where the software 328 represents the software to implement the data aggregation manager); and 3) in operation, the electronic devices implementing the data aggregation manager and other architectural components would be communicatively coupled (e.g., by a network) and would establish between them (or through one or more other layers) connections for streaming metrics and events. Other configurations of electronic devices may be used in other implementations (e.g., an implementation in which the architectural components and/or the data aggregation manager are implemented on a single electronic device 300).

In electronic devices that use compute virtualization, the set of one or more processor(s) 322 typically execute software to instantiate a virtualization layer 308 and software container(s) 304A-R (e.g., with operating system-level virtualization, the virtualization layer 308 represents the kernel of an operating system (or a shim executing on a base operating system) that allows for the creation of multiple software containers 304A-R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 328 (illustrated as instance 306A) is executed within the software container 304A on the virtualization layer 308. In electronic devices where compute virtualization is not used, the instance 306A on top of a host operating system is executed on the "bare metal" electronic device 300. The instantiation of the instance 306A, as well as the virtualization layer 308 and software containers 304A-R if implemented, are collectively referred to as software instance(s) 302.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 4:
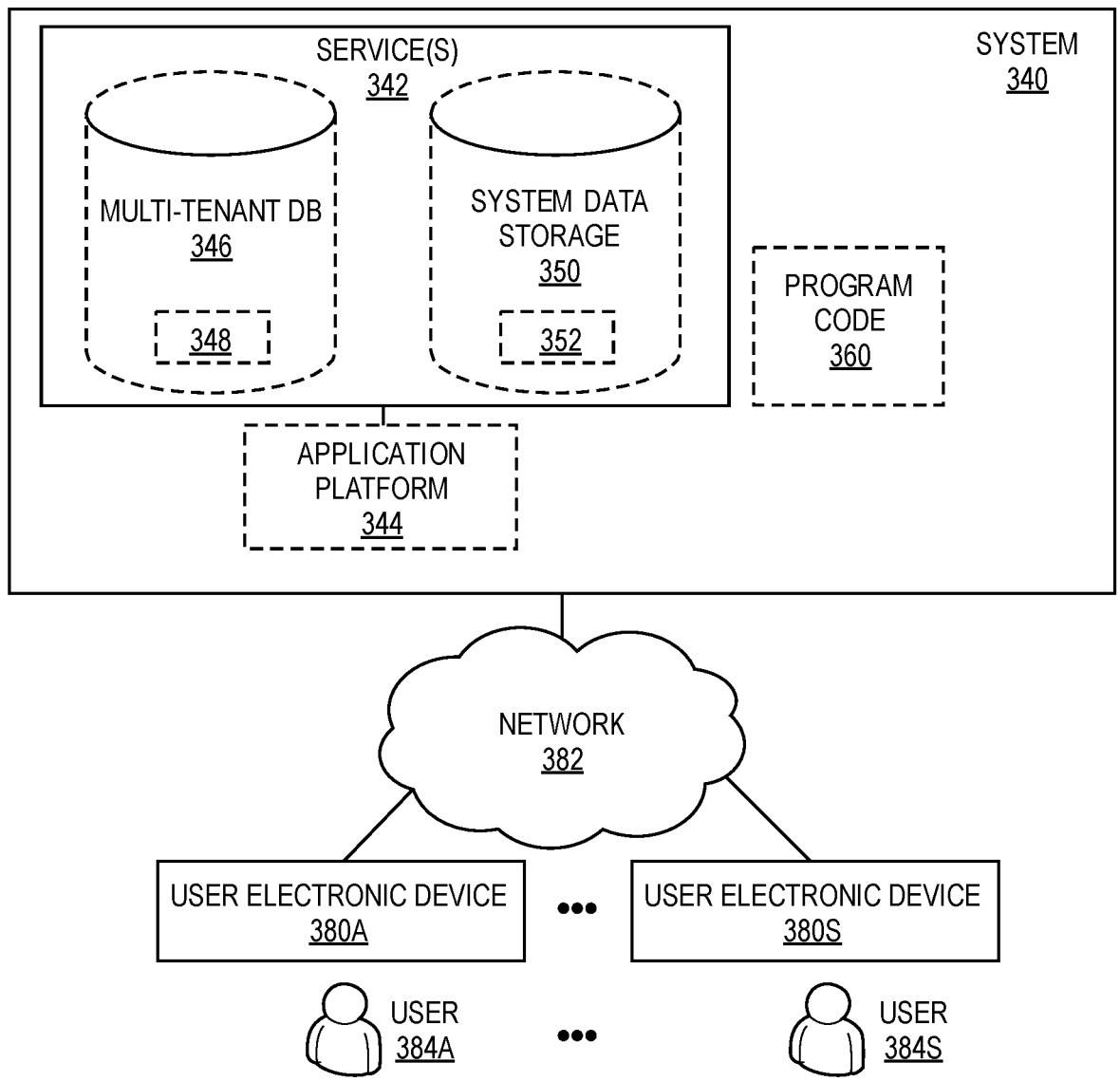
FIG. 4 is a block diagram of an environment where a data aggregation manager may be deployed, according to some implementations.

FIG. 4 is a block diagram of an environment where a data aggregation manager may be deployed, according to some implementations. A system 340 includes hardware (a set of one or more electronic devices) and software to provide service(s) 342, including the data aggregation manager service. The system 340 is coupled to user electronic devices 380A-S over a network 382. The service(s) 342 may be on-demand services that are made available to one or more of the users 384A-S working for one or more other organizations (sometimes referred to as outside users) so that those organizations do not need to necessarily be concerned with building and/or maintaining a system, but instead makes use of the service(s) 342 when needed (e.g., on the demand of the users 384A-S). The service(s) 342 may communication with each other and/or with one or more of the user electronic devices 380A-S via one or more Application Programming Interface(s) (APIs) (e.g., a Representational State Transfer (REST) API). The user electronic devices 380A-S are operated by users 384A-S.

In one implementation, the system 340 is a multi-tenant cloud computing architecture supporting multiple services where the data aggregation manager and other example architectural components or similar components, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 340 may include an application platform 344 that enables PAAS for creating, managing, and executing one or more applications developed by the provider of the application platform 344, users accessing the system 340 via one or more of user electronic devices 380A-S, or third-party application developers accessing the system 340 via one or more of user electronic devices 380A-S.

In some implementations, one or more of the service(s) 342 may utilize one or more multi-tenant databases 346 for tenant data 348, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user electronic device 380A-S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the one or more multi-tenant database 346 and/or system data storage 350.

In some implementations, the service(s) 342 are implemented using virtual applications dynamically created at run time responsive to queries from the user electronic devices 380A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the data aggregation manager, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 340 and the user electronic devices 380A-S.

Each user electronic device 380A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 340. For example, the user interface device can be used to access data and applications hosted by system 340, and to perform searches on stored data, and otherwise allow a user 384 to interact with various GUI pages that may be presented to a user 384. User electronic devices 380A-S might communicate with system 340 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 380A-S might include an HTTP client, commonly referred to as a "browser," for sending and receiving HTTP messages to and from server(s) of system 340, thus allowing users 384 of the user electronic device 380A-S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of data aggregation in a multi-tenant system, the method comprising:
   receiving, at a data aggregation manager, an event from an activity tracking component where the activity tracking component is executed by a first electronic device communicatively coupled to a second electronic device that executes the data aggregation manager;
   generating, by the data aggregation manager, a first hash value based on a first identifier in the event;
   generating, by the data aggregation manager, a second hash value based on a second identifier in the event;
   storing, by the data aggregation manager, event message information to an entry of a metric storage database in a partition according to the first hash value and the second hash value, in response to determining the metric storage database does not include a prior copy of the event, where the entry can include event message information for multiple events having a same value of the first hash value or of the second hash value; and
   updating, by the data aggregation manager, a metric count for the entry, in response to storing the event message information to the entry.

2. The method of data aggregation of claim 1, further comprising:
   discarding the event in response to determining that the metric storage database includes a prior copy of the event in the entry corresponding to the first hash value and the second hash value.

3. The method of data aggregation of claim 1, further comprising:
   aggregating a metric count across partitions in the metric storage database.

4. The method of data aggregation of claim 1, wherein the event is generated by the activity tracking component.

5. The method of data aggregation of claim 1, wherein the first identifier is an asset identifier that uniquely identifies an activity or engagement.

6. The method of data aggregation of claim 1, wherein the second identifier is a target identifier to uniquely identify a target recipient of the event.

7. The method of data aggregation of claim 1, wherein the first hash value determines a horizontal partition in the metric storage database.

8. The method of data aggregation of claim 1, wherein the second hash value determines a vertical partition in the metric storage database.

9. The method of data aggregation of claim 1, wherein the activity tracking component outputs a message queue including data sourced by different tenants of the multi-tenant system, the event included in a message of the message queue and sourced by a source tenant.

10. The method of data aggregation of claim 9, wherein receiving the event from the activity tracking component comprises:
    partitioning the messages of the message queue according to the source tenant, the first identifier, and the second identifier.

11. A non-transitory machine-readable storage medium that provides instructions that, if executed by a processor, will cause said processor to perform operations comprising:
    receiving, at a data aggregation manager, an event from an activity tracking component where the activity tracking component is executed by a first electronic device communicatively coupled to a second electronic device that executes the data aggregation manager;
    generating, by the data aggregation manager, a first hash value based on a first identifier in the event;
    generating, by the data aggregation manager, a second hash value based on a second identifier in the event;
    storing, by the data aggregation manager, event message information to an entry of a metric storage database in a partition according to the first hash value and the second hash value, in response to determining the metric storage database does not include a prior copy of the event, where the entry can include event message information for multiple events having a same value of the first hash value or of the second hash value; and updating, by the data aggregation manager, a metric count for the entry, in response to storing the event message information to the entry.

12. The non-transitory machine-readable storage medium of claim 11, the operations further comprising:

discarding the event in response to determining that the metric storage database includes a prior copy of the event in the entry corresponding to the first hash value and the second hash value.

13. The non-transitory machine-readable storage medium of claim 11, the operations further comprising:

aggregating a metric count across partitions in the metric storage database.

14. The non-transitory machine-readable storage medium of claim 11, wherein the event is generated by the activity tracking component.

15. The non-transitory machine-readable storage medium of claim 11, wherein the first identifier is an asset identifier that uniquely identifies an activity or engagement.

16. The non-transitory machine-readable storage medium of claim 11, wherein the second identifier is a target identifier to uniquely identify a target recipient of the event.

17. The non-transitory machine-readable storage medium of claim 11, wherein the first hash value determines a horizontal partition in the metric storage database.

18. The non-transitory machine-readable storage medium of claim 11, wherein the second hash value determines a vertical partition in the metric storage database.

19. A computer system to execute a method of data aggregation in a multi-tenant system, the computer system comprising:

a non-transitory machine-readable storage medium having stored therein a data aggregation manager; and a processor coupled to the non-transitory machine-readable storage medium, the processor to execute the data aggregation manager, the data aggregation manager to receive an event from an activity tracking component executed by another computer system, to generate a first hash value based on a first identifier in the event, to generate a second hash value based on a second identifier in the event, to store event message information to an entry of a metric storage database in a partition according to the first hash value and the second hash value, in response to determining the metric storage database does not include a prior copy of the event, where the entry can include event message information for multiple events having a same value of the first hash value or of the second hash value, and updating a metric count for the entry, in response to storing the event message information to the entry.

20. The computer system of claim 19, wherein the data aggregation manager is further to discard the event in response to determining that the metric storage database includes a prior copy of the event in the entry corresponding to the first hash value and the second hash value.

* * * * *